United States Patent
Meijer et al.

(10) Patent No.: US 12,173,376 B2
(45) Date of Patent: Dec. 24, 2024

(54) METHOD OF MANUFACTURING IRON IN A METALLURGICAL VESSEL

(71) Applicant: TATA STEEL NEDERLAND TECHNOLOGY B.V., Velsen-Noord (NL)

(72) Inventors: Hendrikus Koenraad Albertus Meijer, Bergen (NL); Petrus Gerardus Jacobus Broersen, Lisse (NL); Johan Willem Koenraad Van Boggelen, Alkmaar (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 407 days.

(21) Appl. No.: 17/418,472

(22) PCT Filed: Mar. 3, 2020

(86) PCT No.: PCT/EP2020/055550
§ 371 (c)(1),
(2) Date: Jun. 25, 2021

(87) PCT Pub. No.: WO2020/193086
PCT Pub. Date: Oct. 1, 2020

(65) Prior Publication Data
US 2022/0081733 A1    Mar. 17, 2022

(30) Foreign Application Priority Data
Mar. 22, 2019   (EP) ..................................... 19164537

(51) Int. Cl.
*C21B 3/02*   (2006.01)
*C21B 13/00*  (2006.01)

(52) U.S. Cl.
CPC .............. *C21B 3/02* (2013.01); *C21B 13/008* (2013.01)

(58) Field of Classification Search
CPC ................................ C21B 3/02; C21B 13/008
(Continued)

(56) References Cited

U.S. PATENT DOCUMENTS

2003/0033905 A1* 2/2003 Dry .......................... C21B 11/00
                                                                    75/502
2007/0144306 A1   6/2007 Sorrentino et al.

FOREIGN PATENT DOCUMENTS

AU    2005209334 B2 *  2/2011   ......... C21B 13/0013
CN       1930308 A      3/2007
(Continued)

OTHER PUBLICATIONS

Zhu, Miaoyoung, et al., "Modern Metallurgical Technique, Steel-Iron Smelting", Metallurgical Industry Press, Dec. 31, 2016, pp. 230-233 (in Chinese).

(Continued)

*Primary Examiner* — Brian D Walck
*Assistant Examiner* — Danielle M. Carda
(74) *Attorney, Agent, or Firm* — Vorys, Sater, Seymour and Pease LLP

(57) ABSTRACT

A method of manufacturing iron in a metallurgical vessel, the vessel including a bath of molten iron with on top of the bath of molten iron a layer of slag, wherein a metalliferous feed, carbon containing material, fluxing material, and oxygen or an oxygen-containing gas are introduced into the vessel to convert the metalliferous feed into molten iron that is collected in the bath of molten iron and continuously or semi-continuously tapped from the vessel through an iron—outlet of the vessel, and wherein the composition of the fluxing material is selected to acquire a predetermined (Continued)

Figure 1:
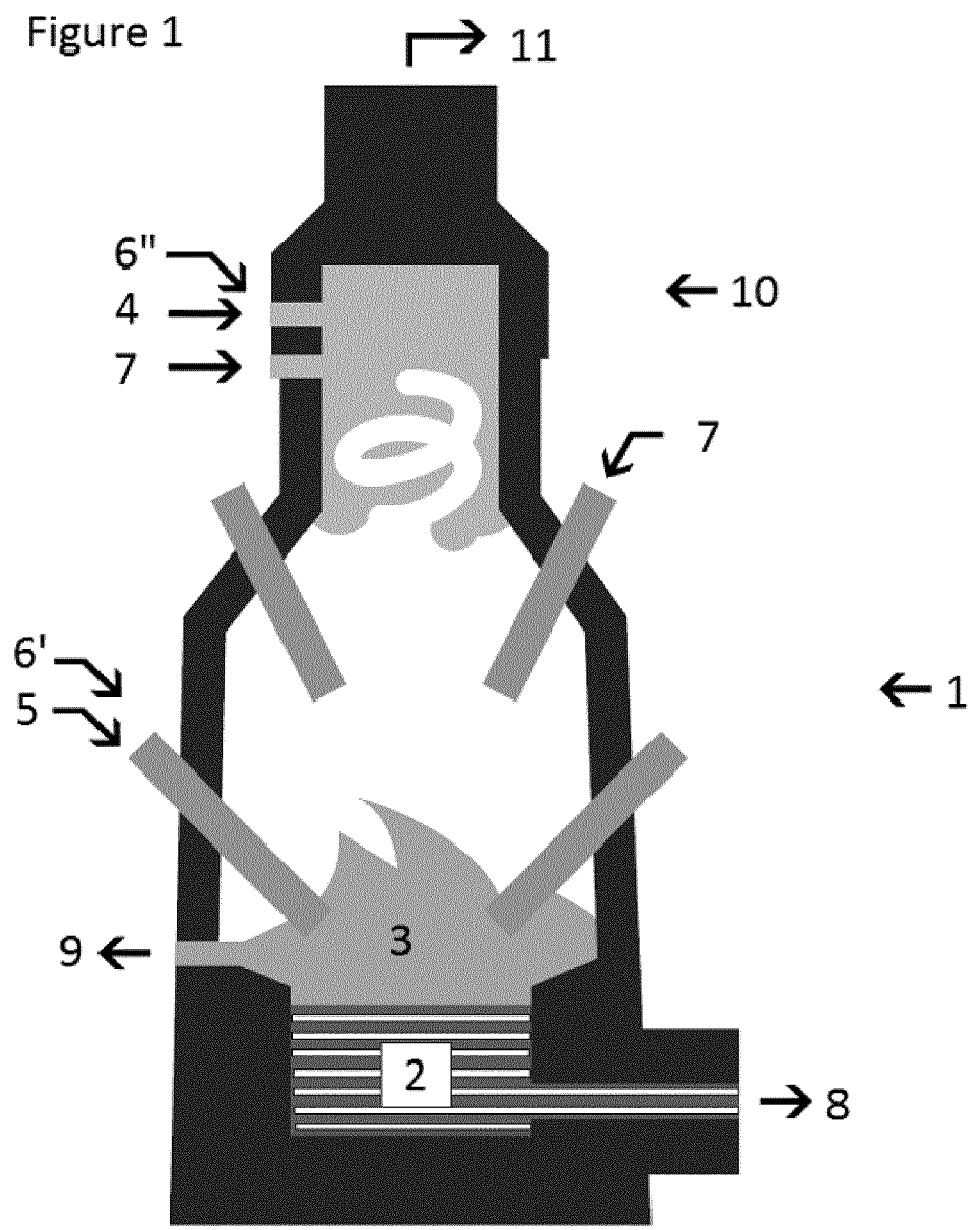

slag chemistry, which slag is regularly tapped out of the vessel through a slag—outlet, and the fluxing material includes slag derived from a steelmaking process.

20 Claims, 2 Drawing Sheets

(58) Field of Classification Search
USPC .......................................................... 75/460
See application file for complete search history.

(56) References Cited

FOREIGN PATENT DOCUMENTS

| | | | |
|---|---|---|---|
| CN | 101445848 A | 6/2009 | |
| CN | 104039986 A | 9/2014 | |
| CN | 105431557 A | 3/2016 | |
| EP | 0726326 A2 | 8/1996 | |
| EP | 1112387 B1 | 5/2005 | |
| EP | 2380995 A1 * | 10/2011 | ......... C21B 13/0013 |
| FR | 2864551 A1 | 7/2005 | |
| WO | 2005073412 A1 | 8/2005 | |
| WO | WO-2013082658 A1 * | 6/2013 | ............. C21B 11/08 |
| WO | WO-2015003669 A1 * | 1/2015 | ............. C04B 28/02 |

OTHER PUBLICATIONS

Chinese Office Action and Search Report mailed Aug. 25, 2022 for CN202080008235.9 to Tata Steel Nederland Technology B.V. filed Mar. 22, 2019, 10 pages.

International Search Report and Written Opinion mailed Apr. 2, 2020 for PCT/EP2020/055550 to Tata Steel Nederland Technology B.V. filed Mar. 3, 2020.

Hlsarna ironmaking process, Wikipedia, URL:<https://en.wikipedia.org/wiki/Hlsarna_ironmaking_process>, retrieved from the Internet May 29, 2024 (citations omitted).

* cited by examiner

METHOD OF MANUFACTURING IRON IN A METALLURGICAL VESSEL

CROSS-REFERENCE TO RELATED APPLICATIONS

This is a § 371 National Stage Application of International Application No. PCT/EP2020/055550 filed on Mar. 3, 2020, claiming the priority of European Patent Application No. 19164537.3 filed on Mar. 22, 2019.

The invention relates to a method of manufacturing iron in a metallurgical vessel, said vessel comprising a bath of molten iron with on top of the bath of molten iron a layer of slag, wherein a metalliferrous feed, carbon containing material, fluxing material, and oxygen or an oxygen-containing gas are introduced into the vessel to convert the metalliferrous feed into molten iron that is collected in the bath of molten iron and continuously or semi-continuously tapped from the vessel through an iron—outlet of the vessel, and wherein the composition of the fluxing material is selected to acquire a predetermined slag chemistry, which slag is regularly tapped out of the vessel through a slag—outlet.

Both EP-B-1 112 387 and EP-A-0 726 326 individually disclose such a method.

EP-B-1 112 387 relates to the so-called HI-smelt process and teaches a direct smelting process for producing metals from a metalliferous feed material in a metallurgical vessel, which process includes the steps of:
  (a) forming a molten bath having a metal layer and a slag layer on the metal layer;
  (b) injecting at least part of the metalliferous feed material and a solid carbonaceous material with a carrier gas into the molten bath via a plurality of lances/tuyeres and smelting the metalliferous material in the metal layer, whereby the solids injection causes gas flow from the metal layer which entrains molten material in the metal layer and carries the molten material upwardly as splashes, droplets and streams and forms a transition zone in a gas continuous space in the vessel above the slag layer, whereby splashes, droplets and streams of molten material contact the side walls of the vessel and form a protective layer of slag;
  (c) injecting an oxygen-containing gas into the vessel via one or more than one lance/tuyere and post-combusting reaction gases released from the molten bath whereby ascending and thereafter descending splashes, droplets and streams of molten material facilitate heat transfer to the molten bath.

EP-A-0 726 326 relates to a process for producing molten pig iron using direct reduction of metalliferrous feed in a pre-reduction stage followed by a final reduction stage. In the pre-reduction stage iron ore (=the metalliferrous feed) is pre-reduced in a melting cyclone by means of a reducing process gas originating from the final reduction stage. A post-combustion occurs in the reducing process gas in the melting cyclone so that said iron ore in said melting cyclone is at least partly melted. The partly melted iron ore passes downwardly into a metallurgical vessel situated beneath the cyclone in which the final reduction takes place by supply of coal (=the carbon containing material) and oxygen, thereby forming a reducing process gas. A partial post-combustion occurs in the reducing process gas in the metallurgical vessel by means of said oxygen supplied thereto. The coal is supplied directly into the slag layer so that the partial post-combustion in the metallurgical vessel is at least partly effected in the slag layer.

In both known processes fluxing material is used to improve or promote the cleanness of the produced iron. As Wikipedia explains limestone and other materials are used as "fluxes" when added to the contents of a smelting furnace for the purpose of purging the metal of chemical impurities such as phosphorus, and of rendering slag more liquid at the smelting temperature. The slag is a liquid mixture of ash, flux, and other impurities.

According to the invention the fluxing material introduced into the metallurgical vessel comprises slag derived from a steel making process, such as from an electric arc furnace but preferably from an LD steelmaking process. This has several notable advantages as will be explained hereinafter. The slag from the steel making process can for instance be introduced in the vessel as lumps of (broken) material.

It is remarked that the LD steelmaking process is well known to the skilled person; the LD steelmaking process or Linz-Donawitz-steelmaking process relates to a method of steelmaking in which carbon-rich molten pig iron is made into steel. Blowing oxygen through molten pig iron lowers the carbon content of the alloy and changes it into low-carbon steel. In this LD steelmaking process fluxes of burnt lime or dolomite are added to promote the removal of impurities and protect the lining of the steelmaking converter.

The inventors have found that by using the slag derived from a steelmaking process in the iron making process of the invention, it is possible to operate this iron steelmaking process according to its requirements, and to reduce the need to introduce fresh limestone, dolomite and lime into this process. At the same time the relatively high iron content in the slag derived from the steelmaking process can at least partly be regained and come available as pig iron resulting from the ironmaking process. Both aspects represent cost savings, and possibly also savings on $CO_2$ production. In another aspect it is found that the quality of the slag of the steelmaking process according to the invention is improved so that it qualifies as feedstock for cement production, obviating the need to dispose of it as landfill or other low value applications.

Preferable features of the invention are mentioned in the dependent claims. It is for instance preferable that the slag from the steelmaking process is ground into particle sizes making same suitable for pneumatic injection into the vessel. This enables that existing equipment that is used in the ironmaking process according to the prior art can be used to introduce the slag from the steelmaking process into this existing process. It is in this connection found preferable that the slag from the steelmaking process is ground into particle sizes of less than 3 mm.

To promote the effectiveness as a fluxing agent it is further preferred that the slag from the steelmaking process predominantly comprises particle sizes in the range of 100-300 μm.

Suitably the slag derived from the steelmaking process is mixed with the metalliferrous feed before introducing into the vessel. Optimum results may be achieved by arranging that the slag derived from the steelmaking process is mixed with the metalliferrous feed in a weight ratio slag:metalliferrous feed between 2:98 and 20:80, and preferably between 5:95 and 10:90.

The method of manufacturing pig iron according to the invention can be used in a diversity of processes. One advantageous application is however a method wherein on top of the metallurgical vessel a cyclone is provided in which metalliferrous feed and oxygen are introduced and through which cyclone reaction gases escape from the bath of molten iron below the cyclone.

It may be preferable that the slag derived from the steelmaking process is introduced into the vessel via the cyclone. It is however also possible that the slag derived from the steelmaking process is introduced into the vessel below the cyclone, and then preferably in a mixture with ground carbon containing material which is introduced into the vessel below the cyclone. Another possibility is to introduce the slag both via the cyclone and in a mixture with ground carbon containing material which is introduced into the vessel below the cyclone.

From an energy point of view it is preferred that the slag derived from the steelmaking process is dry-granulated, although it is not excluded that wet granulated slag is used.

In an advantageous embodiment of the method according to the invention the iron that is tapped from the metallurgical vessel through its iron outlet is subsequently further processed in an steelmaking process, wherein the slag derived from this steelmaking process is fed back and introduced into the first mentioned metallurgical vessel which is used for manufacturing the iron.

The invention will hereinafter be further elucidated with reference to a drawing of a non-limiting exemplary embodiment of the method for manufacturing iron in accordance with the invention.

Figure 2:
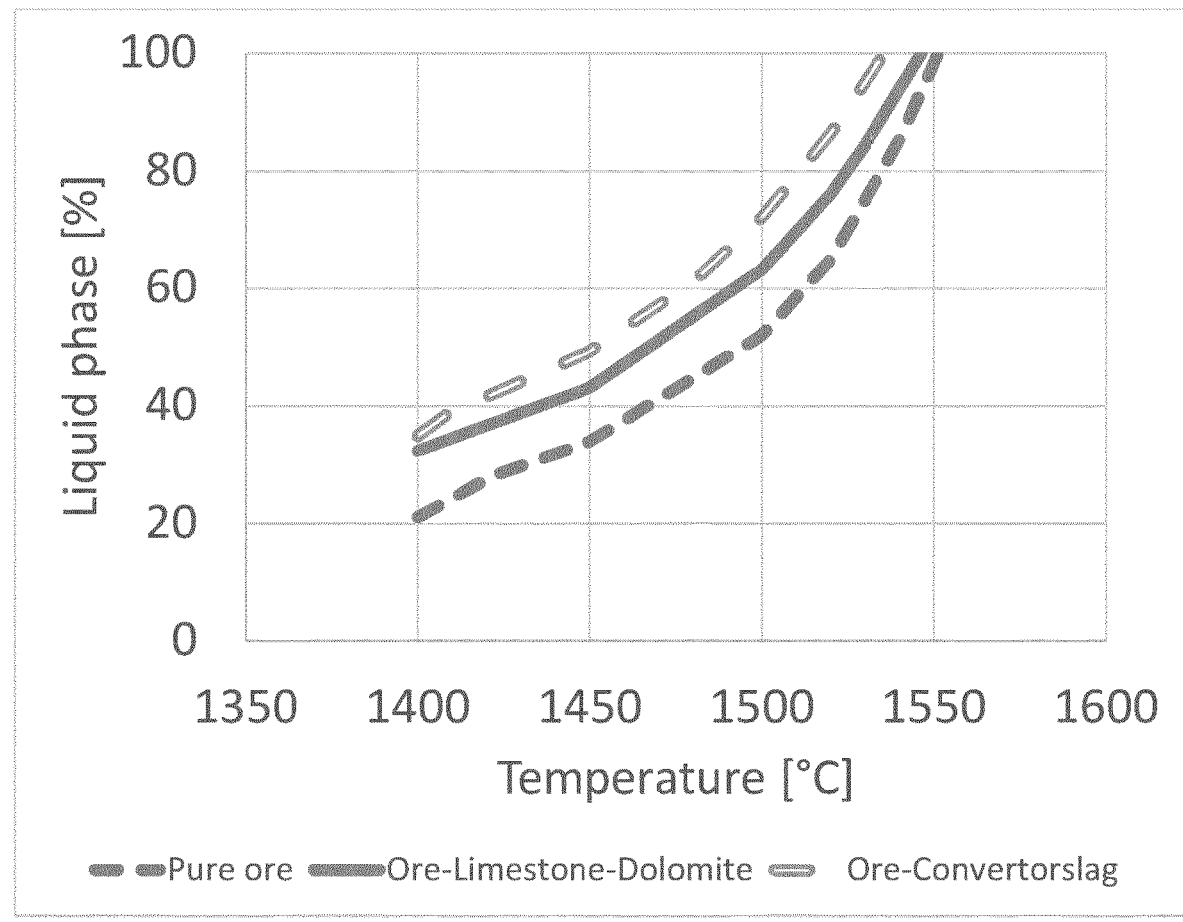

In the drawing:

FIG. 1 shows a vessel for executing a method for manufacturing iron according to the invention; and FIG. 2 shows some calculated results for different metalliferrous feed and flux mixtures.

FIG. 1 depicts the basic elements required for manufacturing iron according to the process of EP-A-0 726 326, wherein a vessel 1 is applied with on top of the vessel 1 a cyclone 10. The invention is however also applicable in a process without such a cyclone, such as the process according to EP-B-1 112 387. For clarity however the method of the invention will be elucidated hereinafter with reference to the process applied when the vessel 1 is provided with a cyclone 10 on top of the vessel 1. Further the invention will be explained with reference to using slag from an LD— steelmaking process, although this does not exclude the use of slag of other steel making processes.

As FIG. 1 shows metalliferrous feed 4 is injected in the smelt cyclone 10 at the top of the vessel 1. The metalliferrous feed 4 melts and partly pre-reduces at this point, after which it drips into the vessel 1. Carbon containing material 5, preferably coal, is injected into the vessel 1 and into the slag layer 3 where a final reduction takes place, forming liquid hot iron and slag 3. The slag 3 composition is in the prior art controlled by injecting burnt lime directly into this slag together with the coal. According to the invention at least part of the burnt lime injected into the vessel 1 is replaced with slag from an (LD) steelmaking process which then acts as an alternative source of CaO. Accordingly the production costs of hot metal is reduced and depending on the CaO source that is being replaced, the $CO_2$ footprint of the process of the invention is also reduced. To reduce the amount of burnt lime, CaO containing material can be injected in the smelt cyclone 10 together with the metalliferrous feed 4, which is preferably iron ore. This improves the melting and fluxing behaviour of the mixture in the smelt cyclone 10. More specifically the method of the invention can be illustrated to operate as follows.

As mentioned the vessel 1 comprises during operation a bath of molten iron 2 with on top of the bath of molten iron 2 a layer of slag 3. Further a metalliferrous feed 4, carbon containing material 5, fluxing material 6', 6", and oxygen 7 or an oxygen-containing gas are introduced into the vessel 1 to convert the metalliferrous feed 4 into molten iron 2 that is collected in the bath of molten iron 2 and continuously or semi-continuously tapped from the vessel 1 through an iron—outlet 8 of the vessel 1. The composition of the fluxing material 6', 6" is selected to acquire a predetermined slag 3 chemistry, which slag 3 is regularly tapped out of the vessel 1 through a slag—outlet 9. According to the invention the fluxing material 6', 6" comprises slag derived from a steelmaking process, preferably an LD steelmaking process. Preferably the slag from the steelmaking process is ground into particle sizes making same suitable for pneumatic injection into the vessel 1. Preferred are particle sizes of less than 3 mm, and more preferably is that the slag from the (LD) steelmaking process predominantly comprises particle sizes in the range of 100-300 μm.

The slag derived from the steelmaking process is mixed with the metalliferrous feed 4 before introducing into the vessel 1, and preferably the slag is mixed with the metalliferrous feed 4 in a weight ratio slag:metalliferrous feed between 2:98 and 20:80, more preferably between 5:95 and 10:90.

As FIG. 1 shows on top of the metallurgical vessel 1 is a cyclone 10 in which the metalliferrous feed 4 and oxygen 7 are introduced and through which cyclone 10 reaction gases 11 escape from the bath of molten iron 2 below the cyclone 10. The slag derived from the steelmaking process is introduced into the vessel 1 via the cyclone 10, or alternatively the slag derived from the steelmaking process is introduced into the vessel 1 both via the cyclone 10 and in a mixture with ground carbon containing material 5 which is introduced into the vessel 1 below the cyclone 10.

The effects of fluxing with the slag derived from an LD steelmaking process are estimated, making use of the thermodynamics software FactSage, which software is known by the skilled person. The calculations are done with three different compositions of mixtures that are introduced in the vessel, notably 1. 100% iron ore;
2. 95.8% iron ore, 2.5% limestone and 1.7% dolomite;
3. 95% metalliferrous feed and 5% LD-slag.

TABLE 1

Composition (wt %) of the ore mixtures used in Factsage calculations.

|  | 1 | 2 | 3 |
| --- | --- | --- | --- |
| $Fe_2O_3$ | 88.90 | 85.12 | 84.35 |
| $Fe_3O_4$ |  |  | 1.04 |
| FeO | 1.07 | 1.02 | 1.13 |
| $SiO_2$ | 3.46 | 3.35 | 4.01 |
| $Al_2O_3$ | 1.42 | 1.37 | 1.46 |
| CaO | 1.39 | 1.33 | 3.42 |
| MgO | 0.51 | 0.49 | 0.85 |
| MnO | 0.82 | 0.79 | 1.02 |
| $P_2O_5$ | 0.048 | 0.046 | 0.126 |
| $TiO_2$ | 0.63 | 0.60 | 0.66 |
| $CaCO_3$ |  | 3.44 | 0.10 |
| $MgCO_3$ |  | 0.76 |  |

Results are visualised in FIG. 2. The X-axis in FIG. 2 represents the temperature in centigrade; and the Y-axis represents the percentage that is in the liquid phase. The lower graph in the figure relates to the results with 100% iron ore; the middle graph relates to the results with 95.8% iron ore (pure ore), 2.5% limestone and 1.7% dolomite; and the highest graph relates to results with a 95% metalliferous feed and 5% converter (LD) slag.

FIG. 2 shows that the use of fluxing agents pre-mixed with the metalliferous feed results in better melting and fluxing behaviour. It is found that the impact of phosphorus from the LD-slag on the manufactured iron is limited, in view of the fact that the method of the invention results in a lower phosphorus hot iron than conventional blast furnace hot iron based on the same input materials.

Further the invention has been demonstrated in the following experiment.

EXPERIMENT

Steelmaking slag, or converter slag, in this case from the LD-plant of Tata Steel in IJmuiden was ground and screened to a size fraction 0-3 mm. 100 tonnes of material was prepared. The LD-slag was pre-mixed with iron ore at a rate of 5% slag per tonne of ore blend (5% slag and 95% iron ore). The upper limit of the amount of LD-slag that can be used in the blend will be determined by the CaO content of the slag and also by the coal ash and iron ore quantity and compositions used in the iron manufacturing process. The slag material was subsequently dried in an ore dryer. In this way around 2000 tonnes of an ore-LD slag blend was prepared for use in the iron manufacturing process. Burnt lime injection was used to trim the slag basicity within the required range for the process. The ore blend was used over a period of three test runs totalling around 20 days of hot metal production.

Results

It was found that the behaviour and control of the method of manufacturing iron according to the invention was similar to using a conventional ore mixture based on a blend of limestone and dolomite. However, differences in slag and metal composition were observed, as shown in Table 2. For example, the P level in the Hot Metal (~0.02%) increased when LD-slag was used, however it was still significantly lower than in a typical blast furnace iron (~0.05-0.10%). With the term B2 in Table 2 reference is made to the ratio $CaO/SiO_2$.

TABLE 2

Average slag and metal compositions for test runs with two different ore feed blends. Note the reported $Fe_{tot}$ in the slag is present as FeOx.

|  | Limestone/dolomite blend % wt | LD slag blend % wt |
|---|---|---|
| Hot Metal |  |  |
| C | 4.3 | 4.0 |
| S | 0.082 | 0.088 |
| P | 0.016 | 0.025 |
| V | 0.0079 | 0.012 |
| Mn | 0.076 | 0.082 |
| Si | <0.01 | <0.01 |
| Slag |  |  |
| B2 [—] | 1.16 | 1.19 |
| CaO | 38.6 | 38.2 |
| $SiO_2$ | 33.2 | 32.0 |
| MgO | 5.5 | 5.2 |
| $Al_2O_3$ | 12.7 | 12.5 |
| $Fe_{tot}$ | 3.5 | 3.7 |
| $P_2O_5$ | 0.11 | 0.22 |
| $V_2O_5$ | 0.064 | 0.14 |

Although the invention has been discussed in the foregoing with reference to an exemplary embodiment of the method of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A method of manufacturing iron in a metallurgical vessel, said vessel comprising a bath of molten iron with a layer of slag on top of the bath of molten iron,
    wherein a metalliferous feed, carbon containing material, fluxing material, and oxygen or an oxygen-containing gas are introduced into the vessel during the manufacturing of iron to convert the metalliferous feed into molten iron that is collected in the bath of molten iron and continuously or semi-continuously tapped from the vessel through an iron-outlet of the vessel, and
    wherein the composition of the fluxing material is selected to acquire a predetermined slag chemistry, which slag is regularly tapped out of the vessel through a slag-outlet, the vessel being provided with a cyclone,
    wherein the fluxing material comprises slag derived from a steelmaking process,
    wherein the particle size of the slag derived from a steelmaking process is less than 3 mm;
    wherein the slag derived from the steelmaking process is not mixed with the metalliferous feed before introducing into the vessel, and/or
    wherein the slag derived from the steelmaking process is introduced into the vessel via and/or below the cyclone.

2. The method of manufacturing iron according to claim 1, wherein the fluxing material comprises slag derived from a LD steelmaking process.

3. The method of manufacturing iron according to claim 1, wherein the slag from the steelmaking process is injected into the vessel by pneumatic injection, wherein fluxing material is fed to the cyclone.

4. The method of manufacturing iron according to claim 1, wherein the slag from the steelmaking process is ground into particle sizes of less than 3 mm.

5. The method of manufacturing iron according to claim 4, wherein the slag from the steelmaking process predominantly comprises particle sizes in the range of 100-300 μm.

6. The method of manufacturing iron according to claim 1, wherein the slag derived from the steelmaking process is mixed with ground carbon containing material before introducing the slag into the vessel below the cyclone.

7. The method of manufacturing iron according to claim 6, wherein the slag derived from the steelmaking process is mixed with the metalliferrous feed in a weight ratio slag: metalliferrous feed between 5:95 and 10:90.

8. The method of manufacturing iron according to claim 1, wherein the slag derived from the steelmaking process is mixed with the metalliferrous feed in a weight ratio slag: metalliferrous feed between 2:98 and 20:80.

9. The method of manufacturing iron according to claim 1, wherein on top of the metallurgical vessel the cyclone is provided in which the metalliferrous feed and oxygen are introduced and through which cyclone reaction gases escape from the bath of molten iron below the cyclone.

10. The method of manufacturing iron according to claim 9, wherein the slag derived from the steelmaking process is introduced into the vessel via the cyclone.

11. The method of manufacturing iron according to claim 9, wherein the slag derived from the steelmaking process is introduced into the vessel below the cyclone.

12. The method of manufacturing iron according to claim 9, wherein the slag derived from the steelmaking process is introduced into the vessel in a mixture with ground carbon containing material which is introduced into the vessel below the cyclone.

13. The method of manufacturing iron according to claim 9, wherein the slag derived from the steelmaking process is introduced into the vessel both via the cyclone and in a mixture with ground carbon containing material which is introduced into the vessel below the cyclone.

14. The method of manufacturing iron according to claim 9, wherein slag composition is controlled by injecting directly into the slag layer a stream comprising slag from a LD steelmaking process, with an absence of burnt lime, which then acts as a source of CaO.

15. The method of manufacturing iron according to claim 9, wherein the fluxing material comprising the slag derived from the steelmaking process is introduced into the vessel below the cyclone while the metalliferrous feed, the carbon containing material, and the oxygen or the oxygen-containing gas are introduced into the vessel.

16. The method of manufacturing iron according to claim 1, wherein the slag derived from the steelmaking process is dry-granulated.

17. The method of manufacturing iron according to claim 1, wherein the iron that is tapped from the metallurgical vessel through its iron outlet is subsequently further processed in a steelmaking process, wherein the slag derived from the steelmaking process is fed back and introduced into the metallurgical vessel which is used for manufacturing the iron.

18. The method of manufacturing iron according to claim 1, wherein slag composition is controlled by injecting directly into the slag layer burnt lime as a first source of CaO and slag from an LD steelmaking process which then acts as an second source of CaO.

19. The method of manufacturing iron according to claim 1, wherein the fluxing material comprising the slag derived from the steelmaking process is introduced into the vessel while the metalliferrous feed, the carbon containing material, and the oxygen or the oxygen-containing gas are introduced into the vessel.

20. The method of manufacturing iron according to claim 1, wherein slag derived from a steelmaking process comprises CaO, wherein the slag derived from the steelmaking process is not mixed with the metalliferrous feed before introducing into the vessel.

* * * * *